United States Patent
Kennedy et al.

[11] Patent Number: 5,493,957
[45] Date of Patent: Feb. 27, 1996

[54] VERTICAL ASSEMBLY EXTRUSION ICE CREAM SANDWICH MAKING MACHINE

[75] Inventors: Cory R. Kennedy, Richmond; Steven D. Balzer, Matthews, both of Va.

[73] Assignee: Interbake Foods, Inc., Richmond, Va.

[21] Appl. No.: 319,109

[22] Filed: Oct. 6, 1994

[51] Int. Cl.$^6$ .......................... A21C 9/04; A21C 15/00; B65B 11/06; B65B 49/08
[52] U.S. Cl. .......................... 99/450.4; 53/209; 53/230; 53/232; 99/450.7
[58] Field of Search .................... 99/450.1, 450.4, 99/450.7; 53/228–232, 223, 224, 222, 226, 209; 426/275, 289, 297, 502; 425/114, 308; 221/202, 205, 241; 198/369, 370

[56] References Cited

U.S. PATENT DOCUMENTS

| | | |
|---|---|---|
| 2,639,677 | 5/1953 | Anderson . |
| 2,794,404 | 6/1957 | Rapp . |
| 2,875,708 | 3/1959 | Hensgen ................... 99/450.4 |
| 2,993,453 | 7/1961 | Fay ........................... 99/450.4 |
| 3,119,353 | 1/1964 | Roehn, Jr. . |
| 3,316,860 | 5/1967 | Peterson . |
| 3,783,772 | 1/1974 | Fay ........................... 99/450.7 |
| 3,828,660 | 8/1974 | Mueller et al. ........... 99/450.7 |
| 3,834,119 | 9/1974 | Armitt et al. . |
| 4,078,362 | 3/1978 | Ellis . |
| 4,098,057 | 7/1978 | Holcomb ................... 53/230 |
| 4,448,012 | 3/1984 | Kauffman et al. . |
| 4,584,933 | 4/1986 | Price . |
| 4,612,852 | 9/1986 | Price et al. . |
| 4,628,664 | 12/1986 | Price . |

Primary Examiner—Timothy F. Simone
Attorney, Agent, or Firm—Klauber & Jackson

[57] ABSTRACT

An apparatus for the preparation of comestible-containing sandwich products comprises a sandwich product assembly station and corresponding means for the fabrication and assembly of a sandwich product in the vertical direction. The apparatus includes an extruder nozzle, wafer trays and corresponding components for the location of wafers on opposite sides of the extruded product, an indexing wheel for receiving the assembled sandwich product, and conveying means for conveying to a wrapping station and from there to a discharge end, wherein all of the components of the machine are mounted in cantilevered fashion on a vertical support or base member. The sandwich product assembly station, the indexing wheel and the wrapping station may be disassembled and retrofitted with like components of different size to accommodate corresponding differences in the sandwich product being fabricated. Also, certain of the components of the conveyor assembly including the movable conveyor means and the output conveyor are laterally adjustable.

6 Claims, 8 Drawing Sheets

VERTICAL ASSEMBLY EXTRUSION ICE CREAM SANDWICH MAKING MACHINE

BACKGROUND OF THE INVENTION

The present invention relates generally to machines for the formation of sandwich-type comestibles, and more particularly to the formation of ice cream sandwiches consisting of flat wafers having a layer of ice cream disposed between them. More particularly, the present invention relates to such machines as employ the assembly of the ice cream sandwich in the vertical direction.

The preparation of ice cream sandwiches and the corresponding equipment known for such preparation has existed for many years. Particularly, equipment that relies upon the vertical assembly of the ice cream sandwiches by the extrusion of the ice cream and the conjoint delivery of adjacent wafers thereto, followed by the vertically downward disposition of the formed ice cream sandwich into an index wheel for disposition onto a conveyor for wrapping, packaging and later operations, is all well-known. Representative U.S. patents illustrating the general operation of such equipment include U.S. Pat. No. 2,794,404 to Rapp, U.S. Pat. No. 3,316,860 to Peterson, U.S. Pat. No. 3,119,353 to Roehn, Jr., and U.S. Pat. No. 3,834,119 to Armitt et al. All of the above are incorporated herein by reference.

Each of the aforementioned disclosures generally relates to an extrusion-type ice cream sandwich making machine, which operates by the extrusion assembly of the ice cream sandwich, the disposition of the thus formed ice cream sandwich into an index wheel having a plurality of slots, and the indexed rotation of said wheel into position for removal of the sandwich and disposition onto a conveyor for further processing.

Through the years numerous modifications have been made to the equipment generally disclosed in the aforementioned patents, to improve efficiency and speed of operation, and to correspondingly reduce downtime caused by misfeeds and the like. Notwithstanding the efforts that have been applied in such connection, certain aspects of the equipment continue to represent time consumptive delays and inefficiencies in processing. These concerns are particularly acute as the industry seeks to manufacture an increasing variety of ice cream sandwich products, which products may vary in size, thickness, shape and other characteristics. Because of consumer demand, ice cream sandwich manufacturers may be obliged to increase the manufacture of a particular ice cream product having certain physical characteristics in precedence to the manufacture of an ice cream product having different characteristics. In such event, it may be necessary to have separate equipment in place and operational, that is dedicated to these products of different dimension.

More specifically, certain of the parts of the ice cream sandwich machine must be modified to account for differences in size and other characteristics of a given ice cream sandwich product. Thus, for example, such parts as the extruder die or nozzle, the inclined wafer trays or chutes that feed the cookies into position in the formation of the sandwich, the index wheel that receives the formed sandwich and transfers it to the conveyor, the conveyor that receives the sandwich and delivers it to the sandwich wrapping station, and the components of such wrapping station, such as the wrapping head, the tucker arms and even the apparatus for the delivery of the wrapping paper and the sizing of individual sheets for each sandwich product, must all be modified. In addition to these obvious modifications, there have to be corresponding adjustments in the timing of the apparatus so that each of the steps involved is carefully coordinated and properly sequenced.

Thus, for example, the delivery of the ice cream sandwich to the wrapping assembly or wrapping head must be coordinated with the delivery of the appropriately sized piece of wrapping material thereto, as well as the reciprocating movement of the elevator, tucker arms, and pusher, that all cooperate to wrap the ice cream sandwich for ultimate conveyance to a packaging line or the like. It can thereby been seen that the extensive modification to the machine to fit it for the operation with the assembly of a differently sized product is extensive. As a result, the traditional approach by ice cream sandwich manufacturers has been to have different machines each dedicated to a given size manufacture, so as to avoid the extensive refitting that would be necessary if a modification in size were attempted with the same equipment.

Also, while the industry has generally appreciated the ever present need for maximizing and maintaining sanitary conditions, the nature of traditional equipment fabricated and in use thus far is still such as to pose difficulties when cleaning is attempted. Most sandwich manufacturing machines are constructed about a conveyor that is in turn supported on both of its lateral edges. The sandwich assembling equipment is generally disposed above such a conveyor and is likewise supported between parallel vertical support members. The obvious benefits of such a construction are its sturdiness and corresponding reliability and precision in use; however, such construction must, by its characteristics, obstruct to some extent the working and moving parts of the equipment that inevitably become soiled in use. As a result, the cleaning of such equipment frequently involves the partial disassembly of many of the moving parts to facilitate the thorough cleaning mandated by governmental sanitation and Board of Health requirements.

Because of increasing manufacturing costs and fluctuations in product demand, it would be desirable to develop and use equipment that is capable of reduced downtime during cleaning, together with rapid modification to meet the needs of the manufacturing of differently sized sandwich products. It is to the satisfaction of both of the aforementioned objectives of the present invention is directed.

SUMMARY OF THE INVENTION

In accordance with the present invention, a machine for the assembly of comestible-containing sandwich products such as ice cream sandwiches is disclosed which is constructed about a vertical support or wall having attached thereto in cantilevered fashion a sandwich assembling station, said sandwich assembling station comprising a central extruder with a nozzle for the discharge of a comestible of a predetermined shape, sandwich wafer dispensing means comprising inclined wafer trays adapted to stably support a plurality of wafers for delivery against the corresponding opposite ends of the extruded comestible product;

indexing means comprising an indexing wheel disposed vertically below the sandwich assembling means, said indexing means comprising an indexing wheel defining a plurality of circumferentially positioned pockets or slots for receiving and transferring sandwiches for horizontal conveyance;

a conveyor assembly communicating with the indexing means for receiving ice cream sandwiches from the discharge end thereof and conveying them horizontally for wrapping, said conveyor assembly comprising movable conveyor means for receiving and urging said ice cream sandwiches forward, a plurality of lugs projecting from said conveyor means adapted to cooperate with said indexing wheel and to engage and urge sandwiches out of said pockets, and conveyor track means disposed medially of the conveyor means, said conveyor track means comprising a fixed conveyor track having a receiving end spaced from the indexing wheel, and an adjustable conveyor track slidably movable with respect to said fixed conveyor track; and sandwich wrapping means at the discharge end of said conveyor, said wrapping means comprising a vertically reciprocable elevator for receiving said sandwich and a sheet of wrapping material and conveying said sandwich and said wrapping material to a wrapping station, and a wrapping station, said wrapping station comprising two laterally disposed and reciprocable side tucking fingers for urging said wrapping paper about the opposite ends of said sandwich, and a bottom tucking device reciprocable in a direction 90° removed from said side tucking device, and co-acting therewith to complete the wrapping of said ice cream sandwich.

The invention extends in a first aspect to the modular construction of the described apparatus, in that the sandwich assembling station, sandwich indexing means and the sandwich wrapping means are all removable from said apparatus and replaceable with corresponding components of different size to accommodate the manufacture of differently sized sandwich products. Thus, the wafer trays, extruder nozzles, indexing wheel, elevator, side tuck fingers and bottom tuck device may all be removed and replaced with like components of different dimension.

A further aspect of the present invention relates to the adjustability of the conveyor means. Specifically, the portion of the conveyor means that is outboard of the vertical support of the apparatus, is reciprocable and may thereby be adjusted in the horizontal plane either inward or outward from the inboard portion of said conveyor means and the vertical support wall, to accommodate corresponding differences in the size of the sandwich product being manufactured and conveyed. The chain-driven conveyor means is mounted on shafts with slots journaled therein, and corresponding dogs are pivotable into and out of engagement with said slots to secure the corresponding chain sprockets in particular positions therealong. Also, the portion of the conveyor adjacent to said indexing wheel is secured by a pivoting support arm that is releasably engageable and when released, pivots into the vertically downward position to draw said conveyor and sprocket out of the way of said indexing wheel to permit the removal of the latter from its drive shaft, for corresponding replacement.

The apparatus further includes wrapping material dispensing means, including a plurality of wrapping material dispenser spools and indexed timing drive means for delivery of said wrapping paper and the severing of same to a predetermined size for the respective sandwich being wrapped. The means for indexing and severing wrapping paper of a predetermined size is controlled by a series of interlocking gears which are likewise interchangeable to correspondingly adjust the size and frequency of the wrapping material being severed and provided. In accordance with the invention, the respective gears defining this sequence and frequency are capable of removal from their axes of rotation and corresponding replacement with gears of differing pitch and size without the need for the adjustment of the disposition of the underlying axes.

The present apparatus may thereby be easily converted to accommodate the need for the production of ice cream sandwiches of different size, simply by the removal and replacement of the key elements of the sandwich fabricating process, as described above. Thus, the extruder, the wafer trays, the indexing wheel, the sandwich elevator and the support for the side tucking devices and bottom tucking devices may all be easily removed and replaced with corresponding elements of different size. Likewise, the conveyors may be adjusted as indicated above by the slidable movement and locking down of the respective guard rails and conveyor sprockets. More generally, the disposition of the entire apparatus in cantilevered fashion, extending from the single vertical support wall, facilitates both the ease of retrofitting as described, and likewise renders the entire apparatus more accessible for rapid cleaning in use.

Accordingly, it is a principal object of the present invention to provide an ice cream sandwich making machine that is capable of rapid and thorough cleaning and maintenance, by the provision of the primary stations of said wrapping machine in cantilevered fashion along a single support wall.

It is a further object of the present invention to provide an ice cream sandwich making machine as aforesaid that is of modular design and capable of the removal and retrofitting of the primary components concerned with the sandwich making process, to facilitate their replacement with like components of different size.

It is a still further object of the present invention to provide an ice cream sandwich making machine as aforesaid that is so designed as to render the removal and retrofitting of primary components rapid by the reduction in the number of screw fittings and support plates that must be manipulated to such end.

Other objects and advantages will become apparent to those skilled in the art from a review of the ensuing description which proceeds with reference to the following illustrative drawings.

BRIEF DESCRIPTION OF THE DRAWINGS

FIGS. 3A and 3B are left hand perspective views, each depicting, the wrapping head section of the apparatus of the present invention from different angles. In FIG. 3A, the wrapping head, side tucker devices and pusher are shown, whereas in FIG. 3B, all components except the side tucker fingers have been removed.

DETAILED DESCRIPTION

In its primary aspect, the present invention relates to a machine for the manufacture of comestible-containing sandwich sandwiches, such as ice cream products, which comprises a sandwich forming station, including an extruder apparatus and wafer dispenser means associated lateral thereto, means for receiving, indexing and conveying the formed sandwiches for packaging, a sandwich wrapping station and an output conveyor for the movement of wrapped sandwiches to an output end for further processing, packaging and shipping. Each of the stations of the apparatus of the present invention is mounted in cantilevered fashion against a vertical central support wall. Certain of the components thereof are individually removable and may be replaced with corresponding components of different size, to facilitate the operation of the machine of the invention in the manufacture of differently sized comestible sandwich products.

Figure 1:
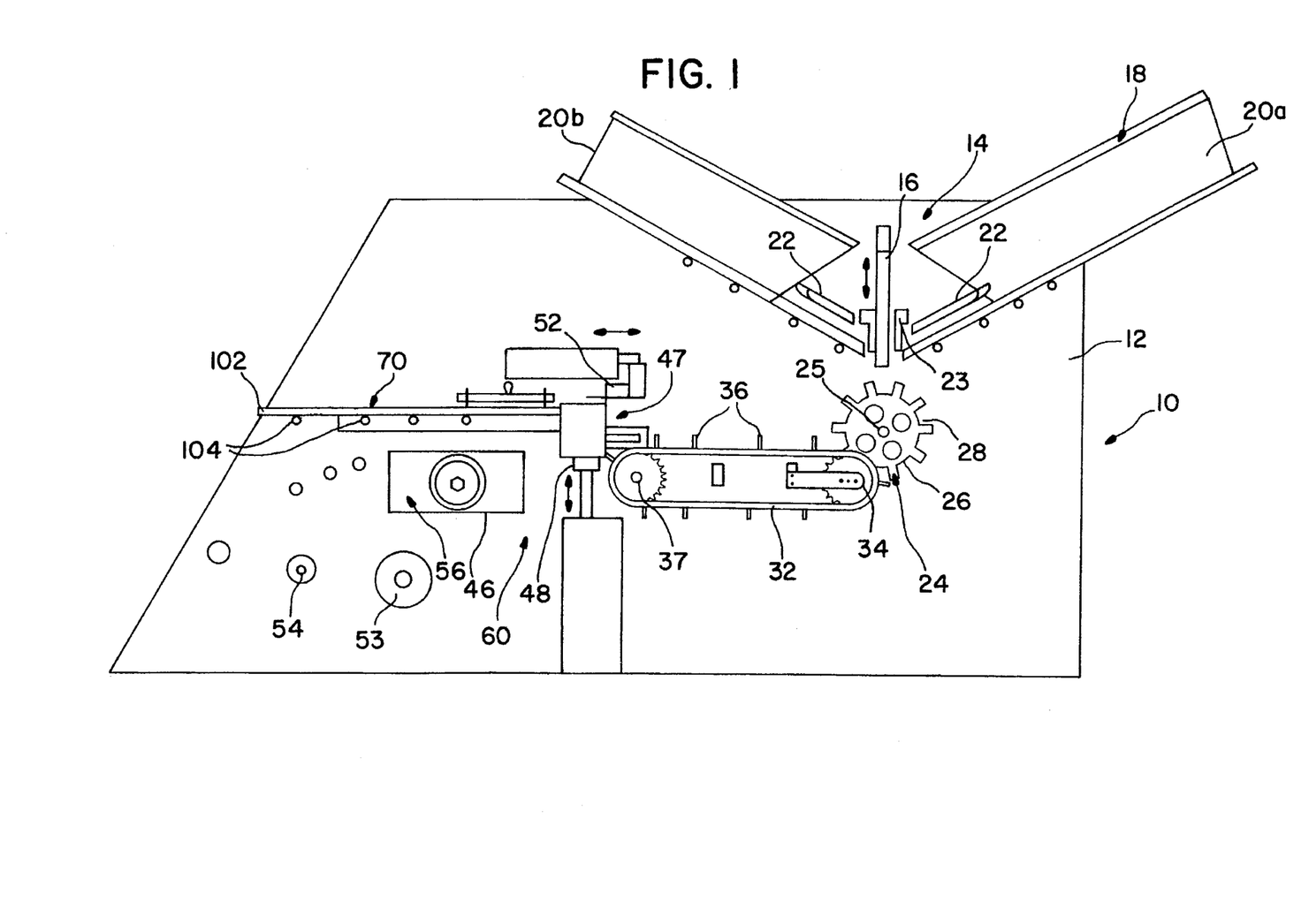
FIG. 1 is a front plan view of the machine of the present invention, setting forth all of the primary component parts thereof.

Referring now to the FIGS., wherein like numerals denote like parts, and more particularly to FIG. 1, ice cream sandwich apparatus 10 is disclosed which comprises a vertical support wall 12, to which are attached all of the primary components and stations of the said apparatus. Thus, apparatus 10 includes a sandwich assembling station 14 comprising centrally located extruder nozzle 16, disposed centrally of wafer dispensing means 18. Wafer dispensing means 18 in turn comprises slanted wafer trays 20A and 20B, disposed for communication with the output end or orifice of extruder nozzle 16. In addition, wafer hold-down bars 22 are mounted above wafer trays 20A and 20B, and in spaced relation thereto corresponding to the height of the wafers being dispensed for assembly of the sandwich product. Wafer hold-down bars 22 and wafer trays 20A and 20B, as well as extruder nozzle 16, are all bolted to support wall 12, and in accordance with the present invention, are removable and replaceable with corresponding components of different size.

A wafer pusher 23 is disposed with its parallel blades straddling extruder nozzle 16. Wafer pusher 23 reciprocates in the vertical plane to urge wafers down into engagement with the extruded comestible to form the sandwich product. Wafer pusher 23 is likewise replaceable to accommodate differences in the size of the sandwich products being made.

The sandwich products thus formed are vertically dropped and thereby delivered to the conveying means, comprising indexing wheel 24. Indexing wheel 24, likewise removable in accordance with the present invention, comprises paired spaced apart circular disks 26, having pockets or notches 28 regularly disposed about the circumference thereof, each pocket or notch 28 sized and configured to receive a fully formed sandwich product. Indexing wheel 24 is adapted to rotate, in this instance, in a counterclockwise fashion as depicted in FIG. 1, to deliver the formed sandwich products from the output of the extruder nozzle 16, to the horizontal conveyor 30. Horizontal conveyor 30 in turn is constructed so as to cooperate with indexing wheel 24 by means of fingers 36 that are timed and positioned to engage the ice cream sandwiches as they are brought into the essentially horizontal position, and to remove them from the pockets 28 of indexing wheel 24 and to urge them forward therealong.

Figure 2:
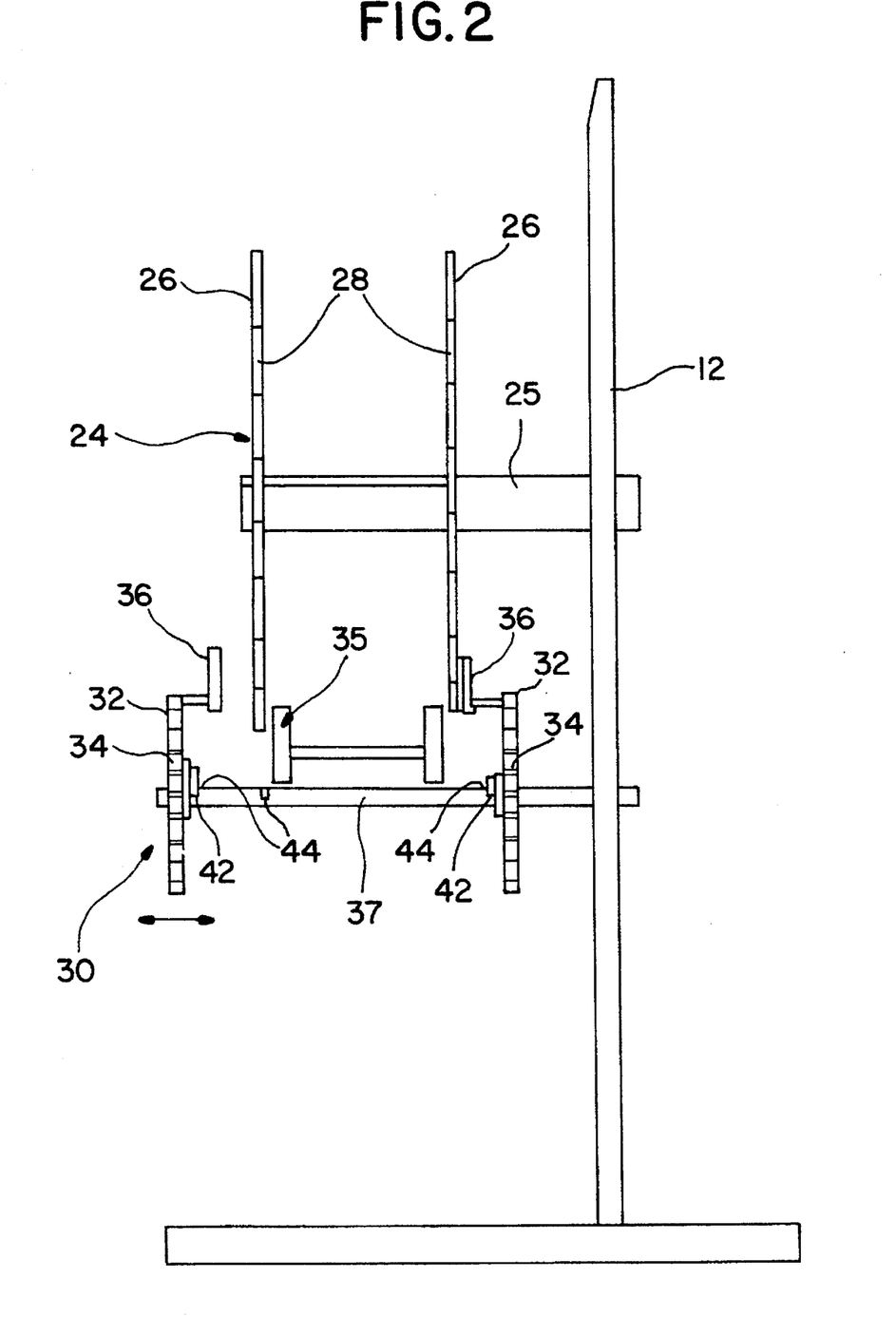
FIG. 2 is a side view of the apparatus of FIG. 1, depicting the cantilevered construction thereof.

Referring now to FIG. 2, conveyor 30 can be seen to define a central opened space within which indexing wheel 24 may rotatably pass. Indexing wheel 24 rotates about horizontal axis 25 as shown, and may be aligned thereon by lock and key engagement with axial rib 27 located on axle 25 mating with a corresponding slot in indexing wheel 24.

Conveyor 30 includes outer chains 32 suspended along sprockets 34 and driven by actuating means not shown in this figure. Fingers 36 disposed on chains 32 are, as indicated, regularly spaced and adapted thereby to synchronously engage ice cream sandwiches for conveyance. Conveyor 30 also includes stationary conveyor track 35 that are positioned medial of sprockets 34. Tracks 35 support the sandwich products as they are urged forward along conveyor 30.

Referring further to FIG. 2, conveyor 30 is disposed in cantilevered fashion and is thereby suspended along horizontally disposed axes of rotation such as axle 37 as shown. Conveyor 30 is adjustable in width to accommodate different size of ice cream sandwich products. More particularly, the sprockets 34 that are outboard and distal to support wall 12 are adapted to move translationally along axles 37. Specifically, sprockets 34 are disposed at predetermined locations along respective axles 32 and are held in place by dogs 42 which pivotably engage corresponding slots 44 on axles. Adjustment of the sprockets is thus accomplished by the loosening of a set screw holding said dogs 42 securely in place, followed by the pivotal rotation of said dogs 42 away from the slots 44 to facilitate the translational movement (not shown) of the sprockets to the next predetermined location, to effect a corresponding adjustment in the width of conveyor 30.

Figure 3A:
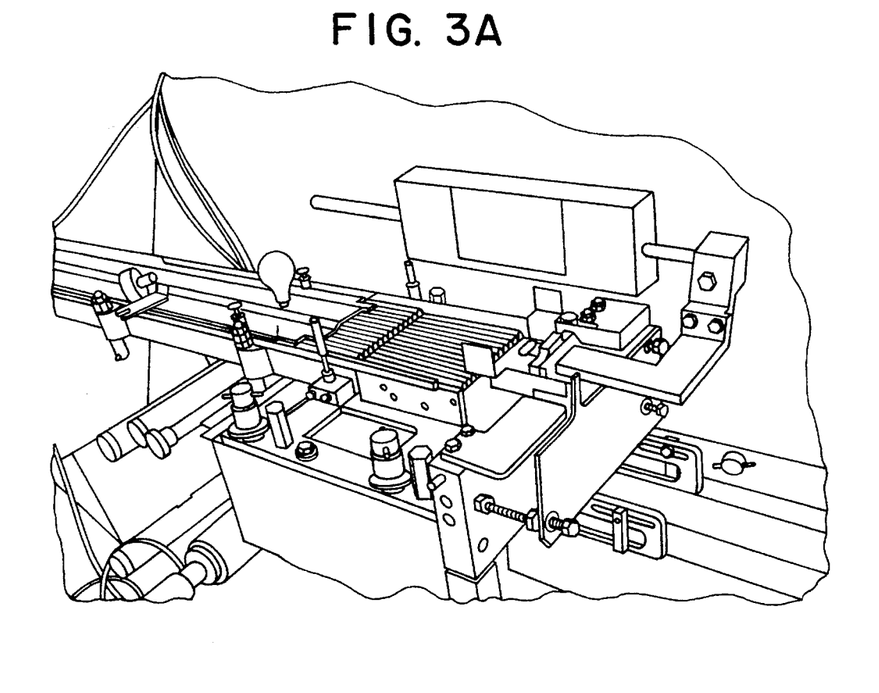
Figure 3B:
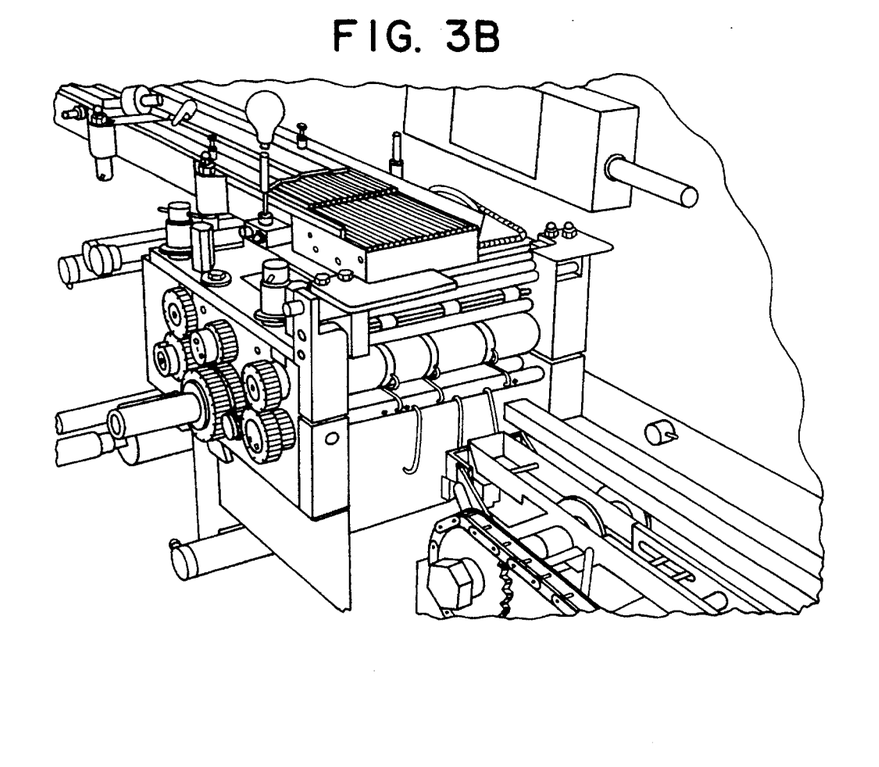
Figure 4:
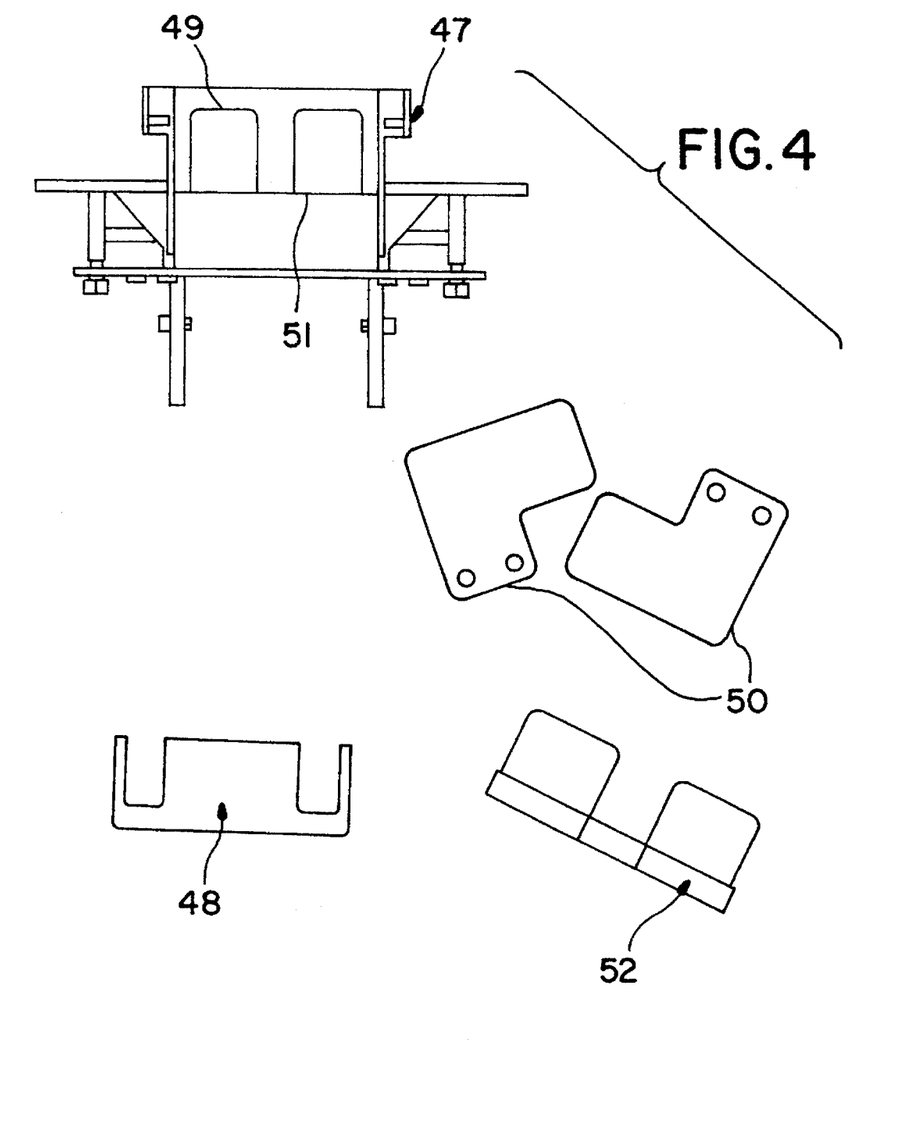
FIG. 4 is a top plan view illustrating the individual component parts that are removed from the wrapping section for retrofitting in accordance with the present invention.

Referring generally to FIGS. 1, 3A and 3B, apparatus 10 includes a wrapping station 46, disposed at the output end of conveyor 30. Wrapping station 46 includes wrapping head 47 defining an elevator shaft, not shown, which terminates at its uppermost end in a platform 49 which cooperates with elevator means 48, side tucking fingers 50 and bottom tucking reciprocating pusher 52 to finally wrap and urge the finished sandwich product toward the output end of the apparatus. Of the components just listed, each is capable of removal and replacement with components of different size to accommodate corresponding differences in the ice cream products being wrapped. In this connection, FIG. 4 depicts the individual components, e.g., the wrapping head 47 defining the platform 49 and the elevator shaft 51, the elevator means 48, the side tucking fingers 50, and the pusher head 52.

Wrapping station 46 further includes means for the dispensing and delivery of wrapping material of predetermined size for disposition over the sandwich product as it is located on elevator 48. Thus, referring to FIG. 1, a payout reel 53 dispenses wrapping material in sheet form that traverses pulleys 54 and is directed into the wrapping head area 56 via paper feeder assembly 60. The wrapping material, not shown, is severed to size upon exiting the paper feeder assembly 60 and is then disposed on top of the sandwich product which in turn rests on the elevator 48. As the elevator moves upward, the sandwich product passes through the elevator shaft not shown, until it reaches the platform. During the travel of the sandwich, the wrapping material is forced downward and into contact with the peripheral edges of the sandwich product. As previously described, laterally disposed side tucking fingers 50 force the corresponding ends of the wrapping material between the bottom of the sandwich product and the top surface of the elevator. At the top of the cycle of the elevator, the sandwich product is in alignment with out set conveyor 70, and is then urged forward by the motion of pusher means 52. A particular assembly of a wrapping head and corresponding pusher element is schematically disclosed in U.S. Pat. No. 4,628,664 to Price, and such disclosure is incorporated herein by reference.

Referring further to FIG. 1, the folding of the wrapping material is completed, and the sandwich travels forward to the output conveyor, which as shown, comprises slide or tray 70, on its way to the discharge end of the apparatus. Tray 70 is adjustable in width like conveyor 30, and the outboard end thereof may be reciprocated in relation to wall 12 to effect such adjustment.

In accordance with the invention, the wrapping material feeder assembly is likewise adjustable by means of the replacement of particular gear components therein. Thus, and with reference to FIG. 5, wrapping material feeder assembly 72 is shown. While the assembly itself including the rollers and other means for indexing and cutting the wrapping material are not in need of direct replacement, certain of the gears that control the timing and predetermination of the size of the wrapping material to be cut, may be replaced. Such replacement will effect a corresponding change in the frequency of paper indexing and cutting to accommodate corresponding differences in product size.

Figure 5:
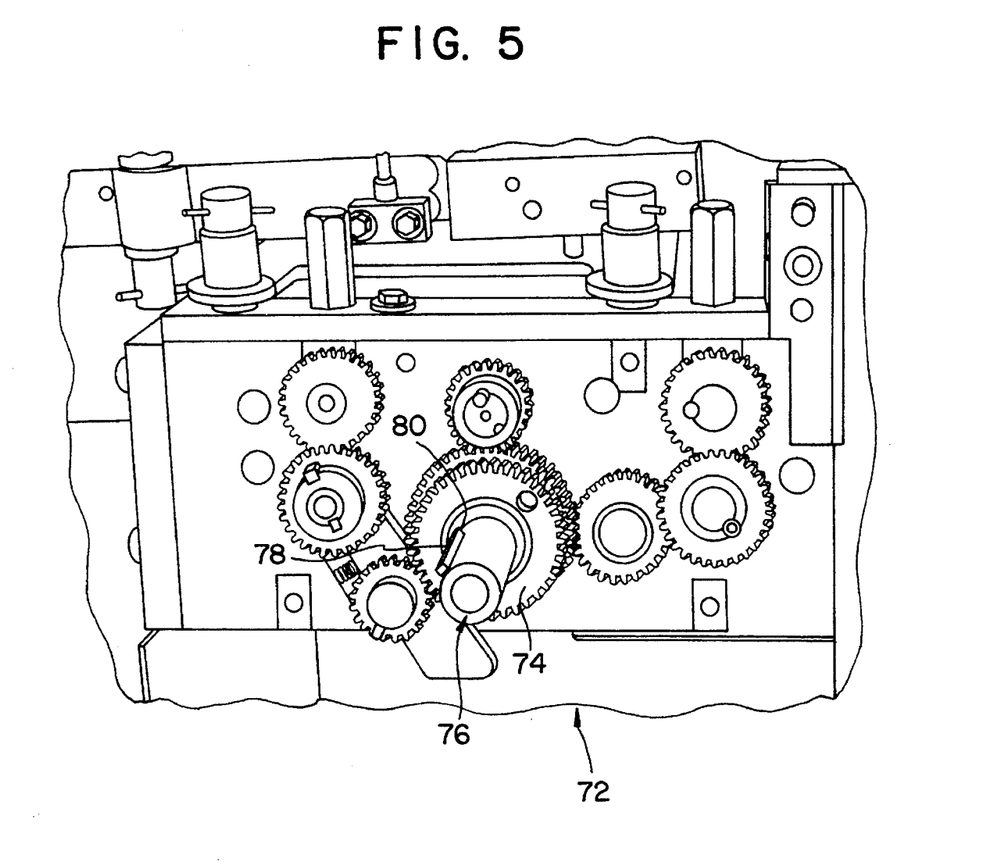
FIG. 5 is a perspective view similar in content to FIGS. 3A and 3B, illustrating the cut-off gears that determine the point for the wrapping paper, located in the wrapping head section of the apparatus of the present invention.

Referring further to FIG. 5, timing gear 74 may be removed from its corresponding shaft 76, and replaced with a gear of a different radius which nonetheless will communicate with the adjacent gears. Thus, timing gear 74 may be drawn forward and replaced with corresponding gear having different radius and, resultingly, a different interaction and effect on timing of the cutting means and thereby an effect on the size of the sheet material cut off. Gear 74 is maintained in alignment on shaft 76 by the disposition of a slot 78 that corresponds to a rib 80. This assures that the replacement of the gear achieves the exact timing modifications desired, and that the gears are in immediate alignment upon retrofitting.

As indicated earlier, the sandwich making machine of the present invention is fully adjustable to accommodate differences in the size of sandwich products being prepared. As indicated above, certain of the components are capable of direct removal and replacement, and these components include the wafer trays, pusher means, wafer hold-down bars, extruder nozzle and indexing wheel of the sandwich product assembly station, the conveyor rails of the conveyor means and the sandwich wrapping head and, in particular, the elevator, the sandwich wrapping platform, the side tucking fingers, the pusher means and the cut-off gears associated with the wrapping paper feed and cutting assembly. Certain other components of the apparatus are otherwise adjustable to accommodate differences in sandwich size, and these include the conveyor means and, in particular, the first chain type in conveyor depicted in FIGS. 1, 2, 6 and 7.

Particularly, the chain type conveyor as discussed earlier is capable of adjustment by the movement of the chain sprockets 34 along their axes of rotation. Specifically and with reference to FIG. 2, the sprocket 34 that is outboard and distal to supporting wall 14 may be moved and thereby adjusted inward in the direction of the supporting wall to reduce the lateral distance and thereby the width of the conveyor. The adjustment means for the sprocket comprise pivotable dogs that are screw adjusted, as shown in FIG. 3B. Referring to FIG. 3B, sprocket 34 is shown in front perspective, and screw adjustment 86 is depicted. A simple turn of screw adjustment 86 causes corresponding dog 42, shown in FIG. 2, to pivot either away from or into engagement with a corresponding slot 44. Axle 37 defines a plurality of slots 44 for the reception of dog 42, to accommodate a corresponding number of predetermined widths for the chain conveyor assembly.

Figure 6:
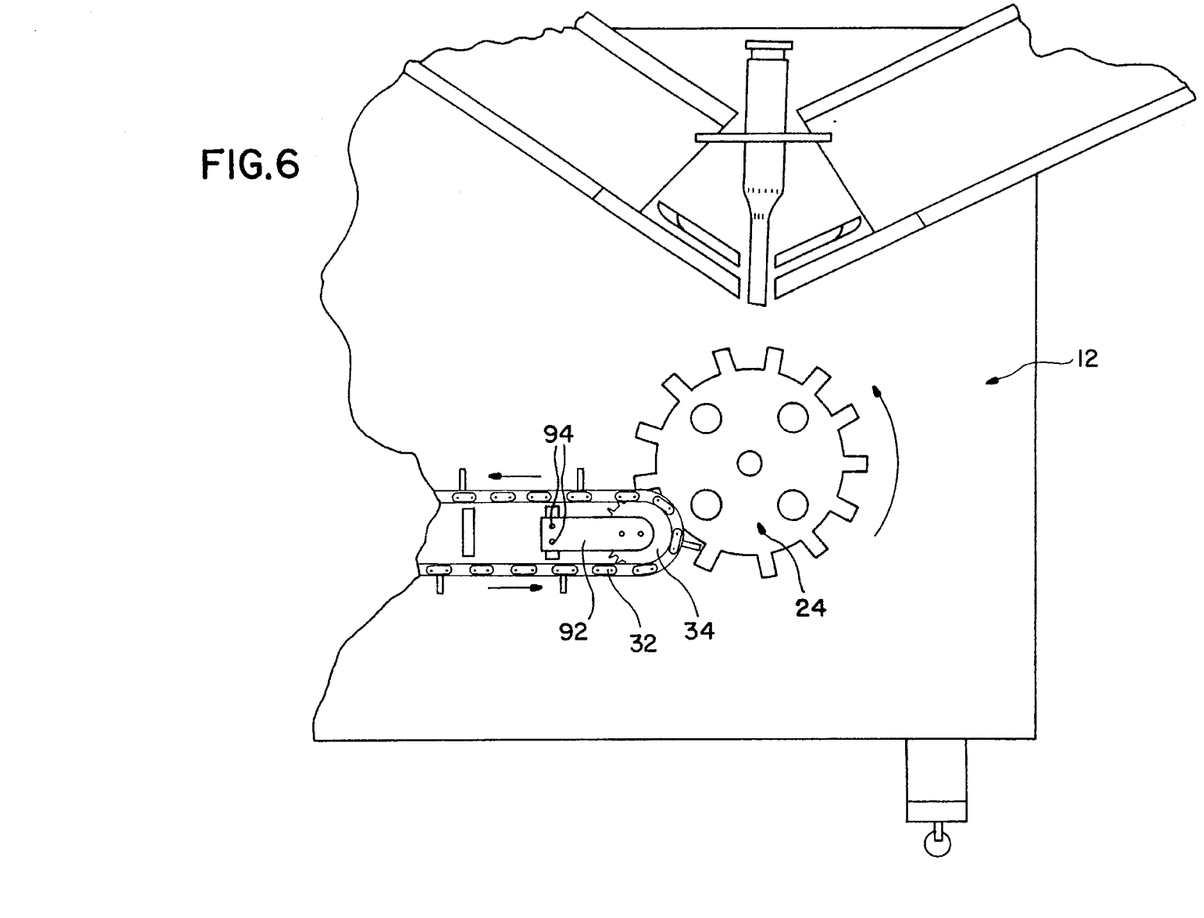
FIG. 6 is a front partial plan view of the apparatus of the present invention, illustrating the co-action of the indexing wheel and the conveyor, including the sprocket and chain.
Figure 7:
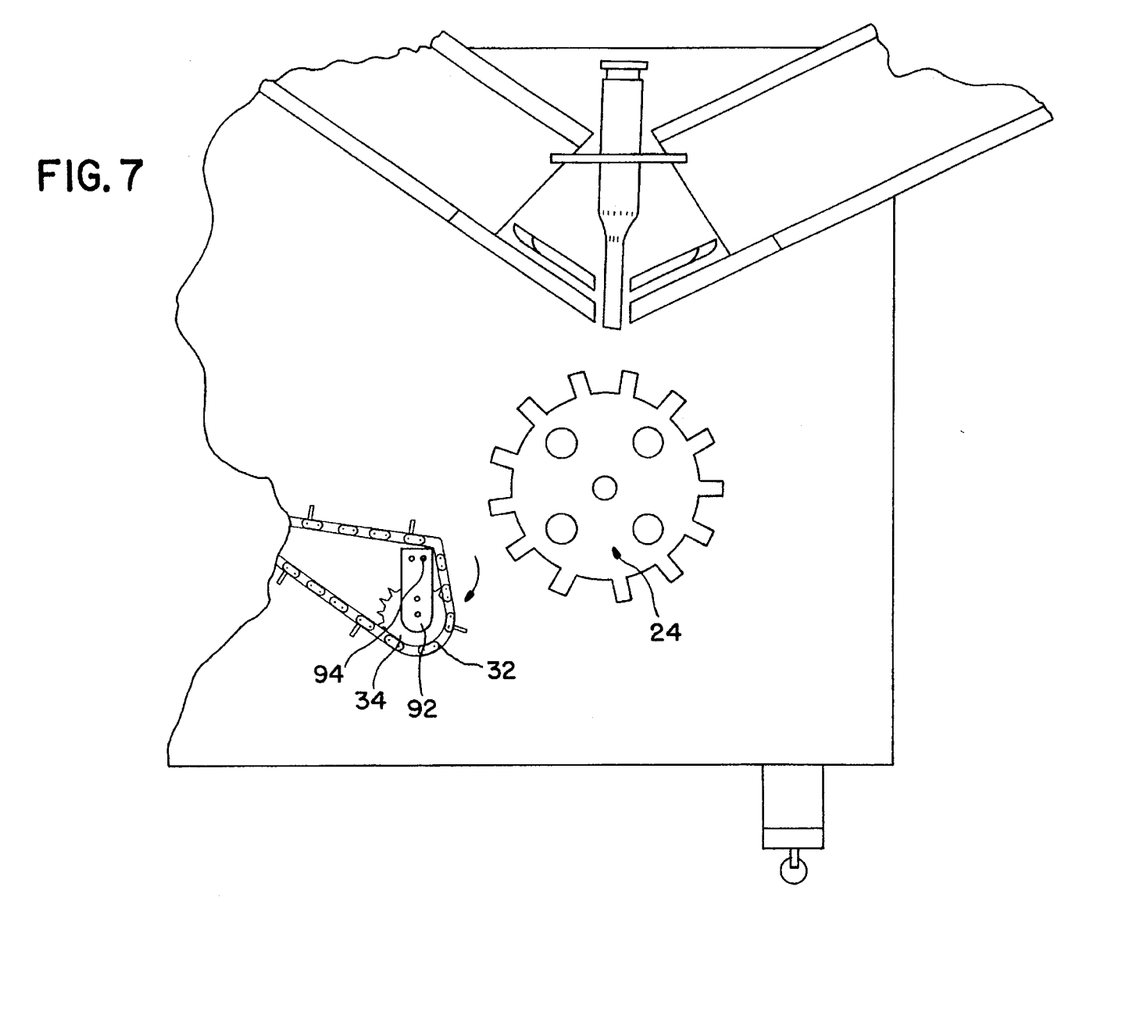
FIG. 7 is a partial fragmentary front view similar to FIG. 6, illustrating the conveyor rotated downwardly and out of the way of the index wheel for removal of the latter.

Referring now to FIG. 6, conveyor 30 also provides means for the pivoting movement of the end thereof positioned adjacent indexing wheel 24. Specifically, the infeed end of chain 32 is maintained on support structure 92, which in turn is held secure to the remainder of conveyor 30 by bolts or the like. Structure 92 is capable of pivoting from the horizontal position in engagement with indexing wheel 24 downward as illustrated in FIG. 7, thereby out of the way of indexing wheel 24 during retrofitting of the machine to accommodate the manufacture of differently sized sandwich products. Thus, one of the bolts 94 may be loosened and removed, allowing support structure 92 to pivot downward and out of the way of the indexing wheel.

The output track 70 that is disposed at the output end of the wrapping head or assembly is likewise laterally adjustable, and, like the conveyor 30, such adjustment is effected from the movement of the outboard edge of the conveyor.

Referring again to FIG. 1, output track 70 defines an outboard rail 102 that may be adjusted by lateral movement inward along support rods 104. Thumb screw-type adjustments, not shown, are utilized, although it is to be understood that corresponding adjustable engagement means are contemplated.

The machine of the present invention offers as part of its advantages ease of maintenance, by virtue of the reliance on a single vertical support wall for the mounting and maintenance of all operating components thereof. Unlike the equipment of the prior art, the present machine does not provide dual support from the lateral edges of the conveyor means, or from a second wall or like structure offering support to each of the rotating or translating components thereof. At most, the machine in use has an outer cover or structure about certain of the components thereof, such as the conveyor means, the wrapping head and wrapping station and the like, all of which may be easily removed for inspection and cleaning.

Figure 8:
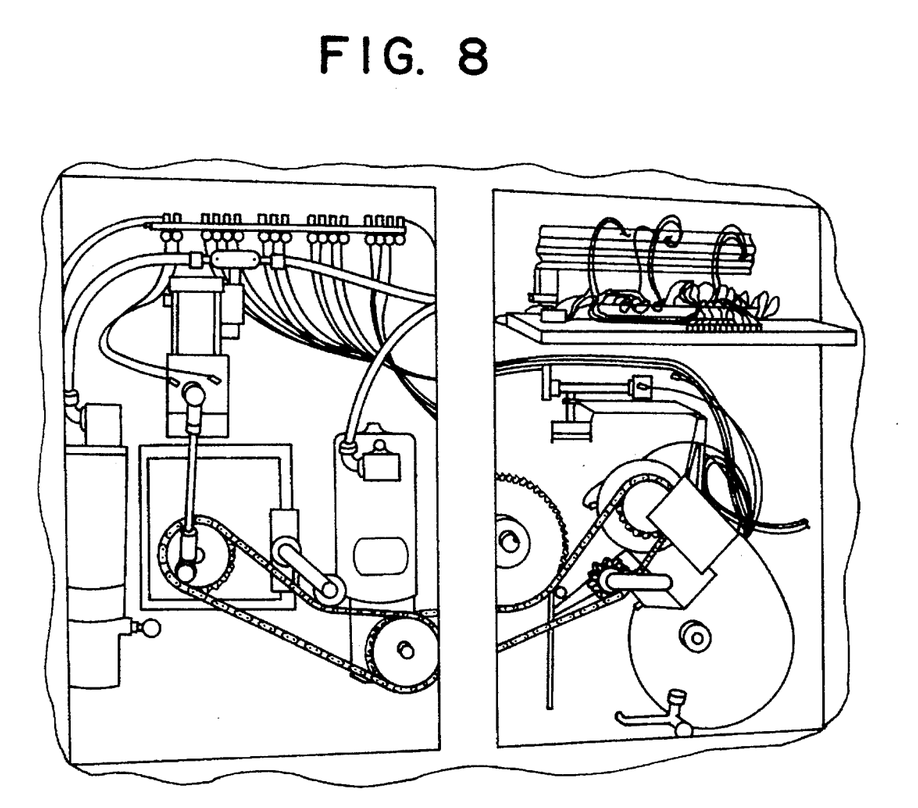
FIG. 8 is a right hand perspective view showing the rear cabinet and hardware of the apparatus of the present invention.

A further aspect of the present invention is the simplification of the actuation thereof, by means of a central actuating means, that is coordinated and connected to all operating components. Specifically, the rear of machine 10 is shown in FIG. 8 and is seen to comprise a vertical wall, to which is mounted a conventional electric motor 100 or the like which is connected via sprockets and chain drives, to each of the primary operating stations of the machine. The motor in turn utilizes a clutch which is engaged by an air cylinder, in distinction to prior equipment that relied on manual actuation. Likewise, the actuation for the elevator and the wrapping head is now achieved by the driving of both components from the same shaft. Also, further support to the respective components of the actuator assembly comprise the disposition of bushings in a triangulated disposition to lend further support to the actuating means and chain drive.

The operation of the machine of the present invention is, despite its differences in construction, substantially the same as that of the equipment such as disclosed in the Armitt et al. patent. That is, the comestible product is extruded and brought into contact with the corresponding wafers, is then delivered to the indexing means for delivery in turn to the first conveyor. The sandwich product thus disposed is delivered to the output end for the first conveyor for placement on the elevator of the wrapping station, where a quantity of wrapping material is disposed thereover and tucked and folded thereabout. Upon exiting the wrapping assembly, the sandwich is urged forward along the fixed conveyor tracks 35 for output to a packaging station.

Having described specific preferred embodiments of the invention with reference to the accompanying drawings, it will be appreciated that the present invention is not limited to those specific embodiments, and that various changes and modifications can be effected therein by one of ordinary skill in the art without departing from the scope or spirit of the invention as defined by the appended claims.

What is claimed is:

1. A machine for the preparation of a sandwich product comprising:

A. a base having an infeed end and a discharge end;
   B. a sandwich product assembly station comprising an extruder nozzle mounted for discharge of a comestible filling material in the vertically downward direction; paired wafer trays for feeding wafers against opposite sides of said extruder nozzle; a vertically reciprocable wafer pusher blade means cooperating therewith to urge wafers downward into contact with said comestible filling material;
   C. sandwich indexing means comprising an indexing wheel rotatably mounted vertically below said sandwich product assembly station, said indexing wheel defining a plurality of circumferentially positioned pockets for receiving and transferring assembled sandwiches for conveyance toward said discharge end;
   D. a conveyor assembly having an input end extending from said indexing means and an output end proximal said discharge end, said conveyor assembly comprising:
      i. movable conveyor means for receiving said sandwiches from said indexing wheel and urging said sandwiches toward said discharge end, including a plurality of lugs projecting from said conveyor means and adapted to cooperate with said indexing wheel to engage and urge said sandwiches out of said pockets, and
      ii. conveyor track means disposed medially of said conveyor means; and
   E. a wrapping assembly located at the output end of said movable conveyor means, said wrapper assembly comprising a wrapping head having an upper platform, a shaft for the upward travel of a sandwich product to said platform, an elevator means for delivery of said sandwich product to said platform, side tucking means reciprocably mounted adjacent said shaft and pusher bar reciprocably mounted adjacent said platform for urging said wrapped product off said elevator and toward said discharge end;
   F. wherein said base comprises a vertical wall member, and wherein said sandwich product assembly station, said sandwich conveyor means, said sandwich wrapping assembly and said conveyor slide means are all mounted in cantilevered relationship on said base.

2. A machine for the preparation of a sandwich product comprising:

A. a base having an infeed end and a discharge end;
   B. a sandwich product assembly station comprising an extruder nozzle mounted for discharge of a comestible filling material in the vertically downward direction; paired wafer trays for feeding wafers against opposite sides of said extruder nozzle; a vertically reciprocable wafer pusher blade means cooperating therewith to urge wafers downward into contact with said comestible filling material;
   C. sandwich indexing means comprising an indexing wheel rotatably mounted vertically below said sandwich product assembly station, said indexing wheel defining a plurality of circumferentially positioned pockets for receiving and transferring assembled sandwiches for conveyance toward said discharge end;
   D. a conveyor assembly having an input end extending from said indexing means and an output end proximal said discharge end, said conveyor assembly comprising:
      i. movable conveyor means for receiving said sandwiches from said indexing wheel and urging said sandwiches toward said discharge end, including a plurality of lugs projecting from said conveyor means and adapted to cooperate with said indexing wheel to engage and urge said sandwiches out of said pockets, and
      ii. conveyor track means disposed medially of said conveyor means; and
   E. a wrapping assembly located at the output end of said movable conveyor means, said wrapper assembly comprising a wrapping head having an upper platform, a shaft for the upward travel of a sandwich product to said platform, an elevator means for delivery of said sandwich product to said platform, side tucking means reciprocably mounted adjacent said shaft and pusher bar reciprocably mounted adjacent said platform for urging said wrapped product off said elevator and toward said discharge end;
   F. said sandwich product assembly station, said sandwich indexing means and said wrapping assembly are removable from said machine and may be replaced with components of different size, and wherein said conveyor assembly and said conveyor slide means are laterally adjustable, all to accommodate differences in the size of sandwich products manufactured by said machine.

3. The machine of claim 1, further including an output conveyor extending from said upper platform toward said discharge end.

4. The machine of claim 3 wherein said output conveyor comprises a conveyor slide means.

5. The machine of claim 2, further including an output conveyor extending from said upper platform toward said discharge end.

6. The machine of claim 5 wherein said output conveyor comprises a conveyor slide means.

* * * * *